United States Patent Office 3,843,464
Patented Oct. 22, 1974

3,843,464
METHOD FOR TREATMENT OF
METALLIC SURFACE
Shoji Usami, Sayama, and Haruo Kozu, Fujisawa, Japan, assignors to Kansai Paint Co., Ltd., Hyogo-ken, Japan
No Drawing. Filed Nov. 14, 1972, Ser. No. 306,304
Claims priority, application Japan, Nov. 16, 1971, 46/91,657
Int. Cl. C12b 1/00
U.S. Cl. 195—2                                    6 Claims

ABSTRACT OF THE DISCLOSURE

A method of treatment of metallic surface wherein a cultured suspension of micro-organism such as Thiobacillus ferrooxidans or Thiobacillus thiooxidans is used in an aerobic culture condition at a temperature of 20 to 45° C. The treatment can be carried out with ease, safety and economy without causing any environmental pollution.

---

This invention relates to a method for treatment of metallic surfaces using micro-organisms.

In the conventional art, the rust, scales or spots formed on metallic surfaces have been removed by chemical methods using mainly acid or alkaline treating solution and mechanical methods using abrasives. However, in the former methods, the treating solutions must be supplemented during the treatment processes as the solutions are liable to lose their chemical activities little by little, and the waste solutions of the treatments must be made innocuous by, for example, neutralization so as not to cause the environmental pollutions. The operations and the apparatus for such waste treatment are relatively complicated which cause the economical disadvantages in the process. Further, these treatment solutions induce the inflammation of skin so that it is difficult to expect perfectly the safe work of the treatment. While, in the latter methods, that is in the mechanical treatments, the smoothing work with the abrasive takes very much time and labor, especially the treatment of an article having complicated configuration.

Accordingly, the object of the present invention is to remove the above-mentioned disadvantages. Further object of the invention is to propose a novel method for the treatment of the metallic surfaces which are formed with rust or scale, or adhered with stains or spots, with a safe, rational and economical manner. And as the result of several extensive studies, the inventors have found a novel method for carrying out the above objects which is characterized in that the method can be performed by using micro-organisms.

The micro-organisms employed in the method of the invention are so to speak chemoautotrophic bacteria which utilize carbon dioxide as the carbon source and inorganic nitrogen compounds as the nitrogen sources and take the energy necessary for the assimilation of them from the oxidation energy of oxidizable inorganic materials.

More particularly, the micro-organisms used in the method of the invention belong to a genus of Thiobacillus (sulfur bacteria) which utilizes the energy produced by the oxidation of sulfur or iron as the assimilation energy. The micro-organisms belong to the Thiobacillus are, for example, Thiobacillus ferrooxidans WU–66B (ATCC—American Type Culture Collection—Deposition No. 21834) and Thiobacillus thiooxidans WU–79A (ATCC Deposition No. 21835). The Thiobacillus ferrooxidans has been separated from the waste water of Dowa Kosaka Mine, Akita-ken, Japan as disclosed in Hakko Kogaku Zasshi (Journal of Fermentation Technology), vol. 49, No. 7 (1971), pages 587–591, the mycological characteristics are shown in the following Table 1. It has been identified as the Thiobacillus genus according to Bergy's Manual of Determinative Bacteriology, 7th ed., as it grows with ferrous material and sodium thiosulfate. Further, it has been clarified that the growth of the Thiobacillus ferrooxidans is produced only by the oxidation energy of ferrous material and the growth rate thereof is larger than that of the oxidation energy of sulfur only.

In the meantime, the Thiobacillus thiooxidans has been separated from the soil of the Manza Hot-spring, Gumma-ken, Japan, the mycological characteristics are shown also in the following Table 1 according to Bergey's Manual of Determinative Bacteriology, 7th ed., by which it has been identified as the genus of Thiobacillus.

TABLE 1

| Characteristics | Thiobacillus ferrooxidans, WU–66B, deposition No. 21834 | Thiobacillus thiooxidans, WU–79A, deposition No. 21835 |
|---|---|---|
| Source | Waste water of a mine. | Soil in a hot-spring. |
| Form | Short rods | Short rods. |
| Size (microns) | 0.3–0.5×1.0–1.5 | 0.4–0.5×1.0–1.5. |
| Motility | + | +. |
| Flagellum | Monotrichous | Monotrichous. |
| Gram stein | − | −. |
| Optimum growth temp., °C | 25–30 | 28–30. |
| Optimum growth pH | 1.5–4.0 | 2.0–5.0. |
| Oxygen demand | + | +. |
| Carbon source: Carbon dioxide demand | + | +. |
| Nitrogen source: | | |
|   Ammonia-type nitrogen | + | +. |
|   Nitrate-type nitrogen | − | +. |
| Energy source: | | |
|   Liquid Medium: | | |
|     Ferrous | + | −. |
|     Sulfur | − | +. |
|     Sodium thiosulfate | + | +. |
|   Agar medium: | | |
|     Ferrous | + | −. |
|     Sodium thiosulfate | + | +. |
| Silica gell medium: Ferrous | + | −. |

In carrying out the treatment of metallic surface according to the present invention, carbon dioxide and oxygen are necessary for the growth of the micro-organism, so that the treatment must be carried out in aerobic condition by aeration, shaking or stirring, and the micro-organism used in the treatment must be kept in good condition to prevent contamination.

Further, the water suspension of the micro-organism must be used at a temperature in the range of 20° to 45° C. When the temperature is below 20° C. the activity of the micro-organism is decreased to cause insufficient treatment. When the temperature is raised higher than 45° C., the micro-organism becomes extinct. As for the water suspension of the micro-organism for the treatment, the cultured medium containing dense cells is preferable, however the culture medium during the fermentation step may also be used.

The micro-organism (chemoautotrophic bacteria) used for the treatment of the invention has several unknown aspects with regard to taxonomy (cf. Mizushori Gijutsu (Water Treatment Technology), vol. 11 (1970), No. 7, pages 17 to 21) and the biochemical features and functions thereof are intricate so that some details are left unknown. However, the mechanism in the metallic surface treatment of the invention by the micro-organism is clarified, that is the treatment owes to the direct action of the micro-organism and to the indirect action of the metabolic product thereof. That is to say, the Thiobacillus ferrooxidans has almost the same functions as those of the iron bacteria, and when the micro-organism contacts the iron surface (where is ionized by the air oxidation, etc., and is liable to be oxidized) the oxidase of the bacteria consumes the activated portion of the metallic surface as the energy source, thereby the condition like the anode of an ionic concentration cell is formed to promote the consumption of the metal, and as the result of the consumption of the metallic surface, the rust, scale and spots on the metallic surface are peeled off. Thereby the metabolism of the micro-organism acts directly to cause the treatment of the metallic surface of the present invention. While, the above-mentioned *Thiobacillus thiooxidans* consumes sulfur or sulfur compounds in place of the above iron, therefore it can be applied to the surface of said metal which contains sulfur, where the mechanism of the functions are the same as those of said *Thiobacillus ferrooxidans*. In addition to that, sulfuric acid is formed in this case as the oxidation product of sulfur which peels off the rust, scale and spots on the metallic surface, therefore the indirect effect of the metabolic product of the micro-organism can be expected.

It goes without saying that the *Thiobacillus ferrooxidans* has similar effect of treatment as that of the *Thiobacillus thiooxidans*. Accordingly, the *Thiobacillus ferrooxidans* can be used for the surface treatment of iron, metals containing iron and metals containing sulfur (by the direct action of the micro-organism), and in addition to that it can be used for the surface treatmets of the metals containing neither iron nor sulfur by adding sulfur or sulfur compounds into the treatment solution to produce sulfuric acid, in which the dissolving activity of the produced sulfuric acid is utilized (by the indirect action of the metabolic product). Further, the *Thiobacillus thiooxidans* is useful for the surface treatments of metals containing sulfur (direct action) and of the metals soluble in sulfuric acid (indirect action). Accordingly, the method of the invention can be employed for the surface treatments of oxidizable metals (e.g. iron and its alloy), metals containing sulfur, and metals soluble in sulfuric acid (e.g. iron, aluminum, zinc, tin, manganese, nickel, chromium and their alloys).

As explained in the above, the present invention relates to a method for the treatment of metallic surfaces which is characterized in that the treatment is carried out by utilizing the action of micro-organisms. As the result of this invention, several effects can be obtained which are advantageous as compared with the conventional methods. That is, a small amount of the micro-organism is sufficient for the surface treatment because the growth of the micro-organism is proceeded during the reaction with the metal to be treated, and there is no necessity to supplement the additional micro-organism during the treatment. The waste of the treatment contains no toxic material, therefore it does not cause the environmental pollution. The waste of the treatment can be disposed of by heating it at a temperature of higher than 50° C. as the micro-organism can be disinfected at such temperature to cease the action thereof. Further, when sufficient mycological cares are taken, the treatment and its waste produce no ill effect for human health and safe operation can be expected. Still further, the method of the invention is carried out by using liquid treating medium so that any surface of metal having a complicated configuration can be treated with ease. Accordingly, the process of the metallic surface treatment can be simplified, and also is improved in the safety and economy.

In order that the invention may be more fully understood, preferred embodiments and supplementary features will be described by way of examples in the following.

EXAMPLE 1

A solution consisting of 3.0 g. of $(NH_4)_2SO_4$, 0.5 g. of $KH_2PO_4$, 0.5 g. of $MgSO_4 \cdot 7H_2O$, 0.1 g. of KCl, 0.1 g. of $Ca(NO_3)_2$, 1 ml. of $10N-H_2SO_4$ and 1000 ml. of water was prepared, and after the sterilization, 140 g. of $FeSO_4 \cdot 7H_2O$ was added into said solution to obtain a culture medium (pH: 2.6). This culture medium was inoculated with 20 ml. of a rinsed suspension of the *Thiobacillus ferrooxidans* WU–66B (ATOC Deposition No. 21834), and applied with a cotton stopper. Then the medium was cultured in an aerobic condition with shaking at 30° C. for 72 hours to obtain the cultured suspension of 0.78 in the cell concentration (transparency of 470 m$\mu$ light ray). Into 500 ml. of thus obtained cultured suspension, 3500 ml. of water and 20 g. of $FeSO_4 \cdot 7H_2O$ were added to prepare the metallic surface treatment solution of the invention.

Then, mild steel plates which gathered rust by 30 days' outdoor exposure were immersed into 3000 ml. of the above obtained treating solution (30° C.), and sterile air was fed into the solution through the cotton stopper, thus the rust removabilities were tested. Each size of said mild steel plates was 300 x 100 x 0.5 mm. In the experiments, one rusted plate was immersed into the treating solution for one hour and then the plate was taken out from the solution to measure the rust removability. After that a certain number of plates (30 plates in total) were immersed into the treating solution each for one hour one by one to measure the change of the rust removability of the treating solution. In the meantime, the measurements of the rust removabilities of 2 hours and 4 hours immersions were carried out in the like manner as the above. The results of the above tests are shown in the following Table 2.

COMPARATIVE EXAMPLE

The rusted mild steel plates (300 x 100 x 0.5 mm.) as used in the foregoing Example 1 were immersed into 3000 ml. of 5% by weight phosphoric acid solution at 20° C. to measure the rust removabilities in the like as the above Example 1, the results of which are shown in the following Table 2.

TABLE 2

| | Examples | | | | | |
|---|---|---|---|---|---|---|
| | Example 1, percent | | | Comparative Example, percent | | |
| Immersion (hours) | 1 | 2 | 4 | 1 | 2 | 4 |
| Plate number of treatments: | | | | | | |
| 10 | 25 | 90 | 100 | 70 | 100 | 100 |
| 20 | 30 | 100 | 100 | 60 | 70 | 60 |
| 30 | 35 | 100 | 100 | 40 | 40 | 20 |

In the above Table 2, the percentages are rust removing ratios which indicate the ratios of the areas in which the rust was removed. Thus the numeral 100% means that the rust was removed completely.

As will be understood from the foregoing Table 2, in case of the phosphoric acid solution which has been used in the conventional art, the rust removability decreases gradually as the plate number of treatments increases because the acidity of the treating solution is reduced, accordingly the treating solution must be supplemented periodically or continuously. On the other hand in the treating solution of the present invention, the rust removability thereof becomes larger with the increase of the treatment number because of the bacterial growth, therefore the replenishment of the treating solution is not necessary.

EXAMPLE 2

A solution consisting of 2.0 g. of glucose, 3.0 g. of $(NH_4)_2SO_4$, 0.5 g. of $KH_2PO_4$, 0.5 g. of $MgSO_4 \cdot 7H_2O$, 0.1 g. of KCl, 0.01 g. of $Ca(ClO_3)_2$, 1 ml. of $10N-H_2SO_4$ and 1000 ml. of water was prepared, and after the sterilization, 140 g. of $FeSO_4 \cdot 7H_2O$ was added into said solution to obtain a culture medium (pH: 2.6). This culture medium was inoculated with 20 ml. of a rinsed suspension of the *Thiobacillus ferrooxidans* US–66B as used in Example 1, and a cotton stopper was fitted to the container. Then the medium was cultured in an aerobic condition with shaking for 48 hours at 30° C., thereby the cultured suspension of 0.28 in the cell concentration (transparency of 470 m$\mu$ light ray) was obtained. Into 500 ml. of thus obtained cultured suspension, 3500 ml. of water, 10 g. of glucose and 20 g. of $FeSO_4 \cdot 7H_2O$ were added to obtain the metallic surface treating solution of the invention.

A mild steel plate (300 x 100 x 0.5) mm.) which was stained with soot and oil spots, was immersed into the above treating soltuion at 30° C., and was kept for 8 hours with a feed of sterile air through the cotton stopper. The above mild steel plate was taken out thereafter from the treating solution and rinsed with water, and found that the soot and oil spots all over the surface of the plate was removed completely to obtain a clean plate.

EXAMPLE 3

A solution containing 2.0 g. of $(NH_4)_2SO_4$, 4.0 g. of $KH_2PO_4$, 0.3 of $CaCl_2 \cdot 2H_2O$, 0.3 g. of $MgSO_4 \cdot 7H_2O$, 10 g. of sulfur powder and 1000 ml. of water was prepared. and was sterilized to obtain a culture medium (pH: 5.0). Said culture medium was inoculated with 20 ml. of a rinsed suspension of the *Thiobacillus thiooxidans* WU-79A (ATCC Deposition No. 21835), applied with a cotton stopper, and cultured in an aerobic condition with shaking for 48 hours at 25° C. Thus the cultured suspension of 0.21 in the cell concentration (transparency of 470 m$\mu$ light ray) was obtained. Thus obtained cultured suspension in an amount of 500 ml. was added with 3500 ml. of water and 20 g. of sulfur powder, thereby the treating solution of the invention was prepared.

Then, a zinc plate (300 x 100 x 1 mm.) which had been dipped in the seawater for 30 days and adhered with rust, seaweeds and barnacles, was immersed into said treating solution for 4 hours with the feed of sterile air through the cotton stopper. After this treatment the zinc plate was taken out from the treating solution and rinsed with water, in which said rust, seaweeds and barnacles were removed completely from the plate and a clean zinc plate could be obtained.

EXAMPLE 4

A solution containing 3.0 g. of $(NH_4)_2SO_4$, 4.0 of $KH_2PO_4$, 0.5 g. of $MgSO_4 \cdot 7H_2O$, 0.3 g. of $CaCl_2 \cdot 2H_2O$, 1 ml. of $10N\text{-}H_2SO_4$, 10 g. of sulfur powder and 1000 ml. of water was prepared, and after the sterilization, 100 g. of $FeSO_4 \cdot 7H_2O$ was added into said solution to obtain a culture medium (pH: 2.6). Said culture medium in an amount of 1000 ml. was then inoculated with 10 ml. of the rinsed suspension of the *Thiobacillus ferrooxidans* WU-66B and 10 ml. of the rinsed suspension of the thiobacillus thiooxidans WU-79A as used in the foregoing examples, and applied with a cotton stopper. Then it was cultured in an aerobic condition with shaking at 30° C. for 72 hours, and the cultured suspension of 0.65 in the cell concentration (transparency of 470 m$\mu$ light ray) was obtained. Into 500 ml. of thus obtained cultured suspension, 3500 ml. of water and 10 g. of $FeSO_4 \cdot 7H_2O$ were added to obtain the treating solution of the invention. An alloy plate (300 x 100 x 1 mm.) consisting of 18% of chromium, 8% of nickel, 1% of sulfur and 73% of iron each by weight, and being exposed outdoors for 30 days to gather rust, was immersed into the above treating solution at 30° C., and sterile air was fed through the cotton stopper for 4 hours. Thereafter, the plate was taken out from the treating solution and rinsed with water to obtain a clean alloy plate.

EXAMPLE 5

The cultured suspension as used in Example 1 was heated at 50° C. and 75° C., and the numbers of remaining live cells were measured, the result of which are shown in the following Table 3.

TABLE 3

| | Time of heating | Number of live cells |
|---|---|---|
| Temp. of heating: | | |
| 50° C | 10 minutes | $1.3 \times 10^3$ cells/ml. |
| 50° C | 30 minutes | 0. |
| 75° C | 10 minutes | 0. |
| Before heating | | $2.7 \times 10^8$ cells/ml. |

In the above Table, the numbers of live cells were measured according to the diluted plate culture method.

As being apparent from the above Table 3, the micro-organism in the treatment solution of the invention can be sterilized at 50° C. for a relatively short period of time, therefore the environmental pollution by the micro-organism will not be caused. On the other hand in the conventional method of the surface treatment, the waste solution of the treatment and the rinse water must be treated to be inoxious before they are discharged. Therefore, a large sum of the investment for the treatment apparatus of the waste has been required.

Accordingly, the method of the present invention is very advantageous in several viewpoints as compared with the conventional method.

It should be emphasized, however, that the specific examples described herein are intended as merely illustrative and in no way restrictive of the invention.

What is claimed is:

1. A method for treating a metallic surface comprising the step of contacting the metallic surface with a cultured suspension containing micro-organism belonging to a genus of thiobacillus at a temperature in the range of 20 to 45° C. in an aerobic culture condition.

2. A method of cleaning the surface of a metal article at least partially coated with objectionable foreign material such as oxidation, stains, oil, barnacles, or the like, comprising the steps of:
   (a) providing an immersion bath comprising a cultured suspension of a micro-organism belonging to a genus of thiobacillus;
   (b) immersing said article to be cleaned into said bath for a predetermined time sufficient to effect release of said objectionable materials from the surface of said metal article;
   (c) withdrawing said metal article from said bath; and
   (d) rinsing said metal article with a fluid and removing the released objectionable material and suspension from the surface thereof to provide a clean surface.

3. The method according to claim 2 wherein said bath is maintained at a temperature ranging from 20° C. to 45° C., and wherein the additional step of aerating the bath is provided.

4. A method for treatment of metallic surface as claimed in claim 1 in which said micro-organism is at least one of *Thiobacillus ferrooxidans* and *Thiobacillus thiooxidans*.

5. A method for treatment of metallic surface as claimed in claim 1 in which said micro-organism is at least one of *Thiobacillus ferrooxidans* WU-66B strain (ATCC Deposition No. 21834) and *Thiobacillus thiooxidans* WU-79A strain (ATCC Deposition No. 21835).

6. A method for treatment of metallic surface as claimed in claim 1 in which the metallic surface to be treated is taken from the group consisting eseentially of iron, aluminum, zinc, tin, manganese, nickel, chromium or their alloys.

References Cited
UNITED STATES PATENTS

| 2,395,694 | 2/1946 | Spence et al. | 134—2 |
| 3,679,397 | 7/1972 | O'Connor et al. | 195—2 X |

A. LOUIS MONACELL, Primary Examiner

R. B. PENLAND, Assistant Examiner

U.S. Cl. X.R.

134—42; 148—1